Jan. 10, 1967    H. N. BEHNKE    3,296,900
PIPE ROTATING DEVICE
Filed Dec. 22, 1964    2 Sheets-Sheet 1
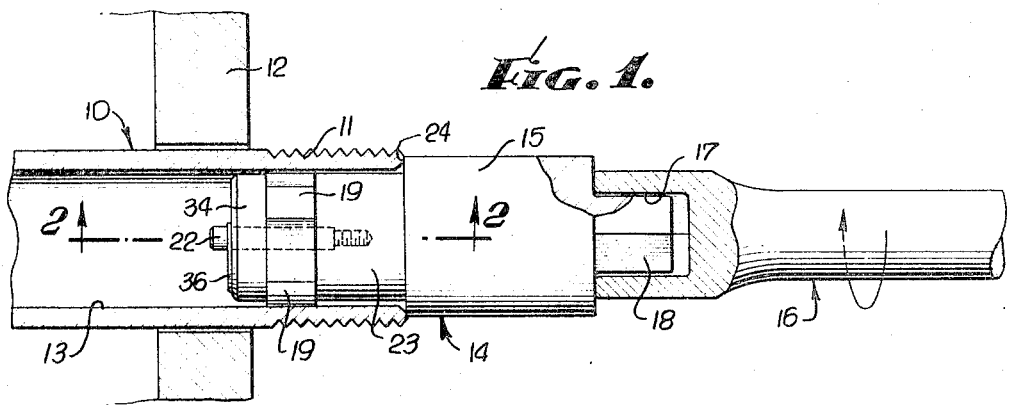
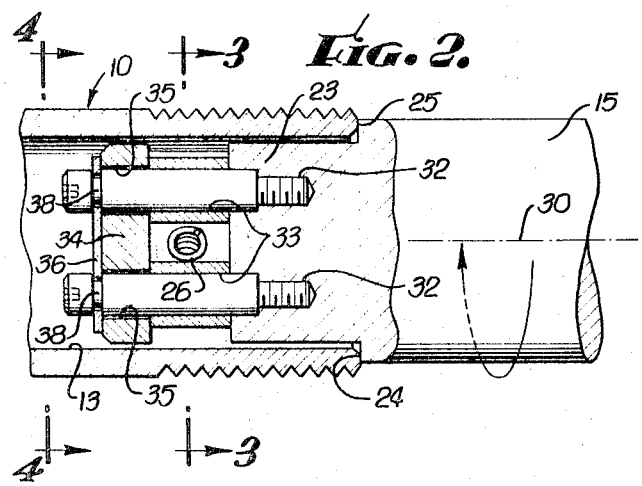
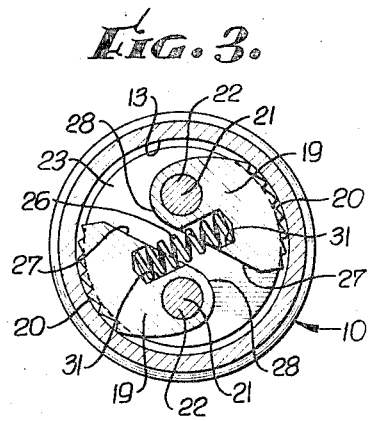
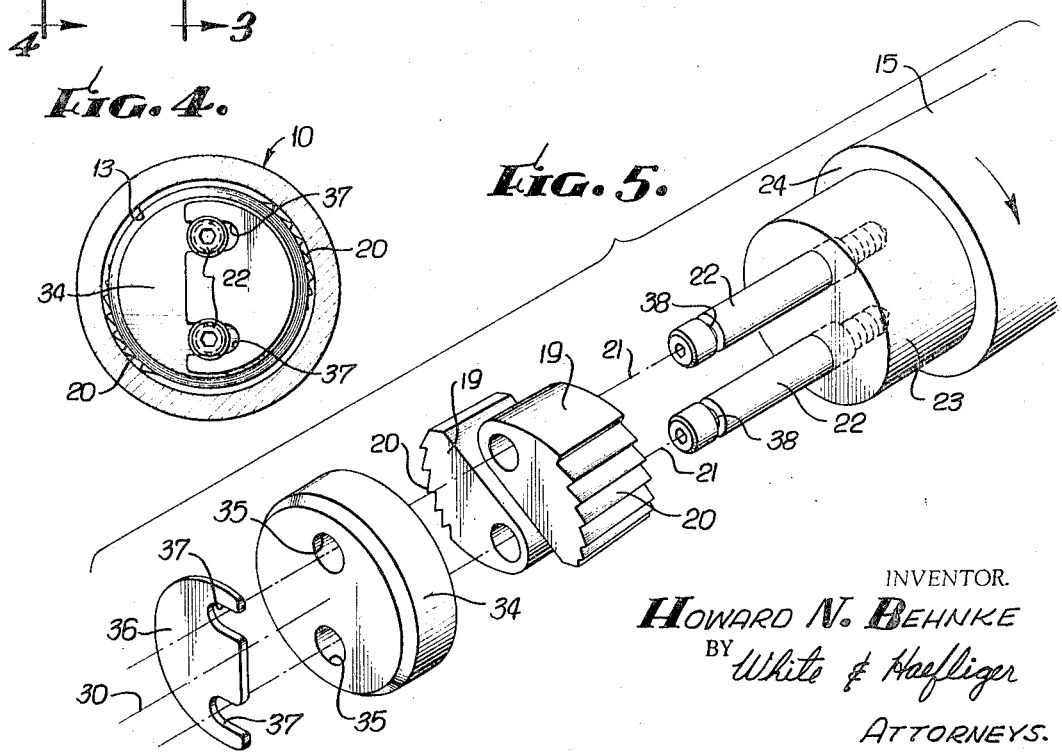
INVENTOR.
HOWARD N. BEHNKE
BY White & Haefliger
ATTORNEYS.

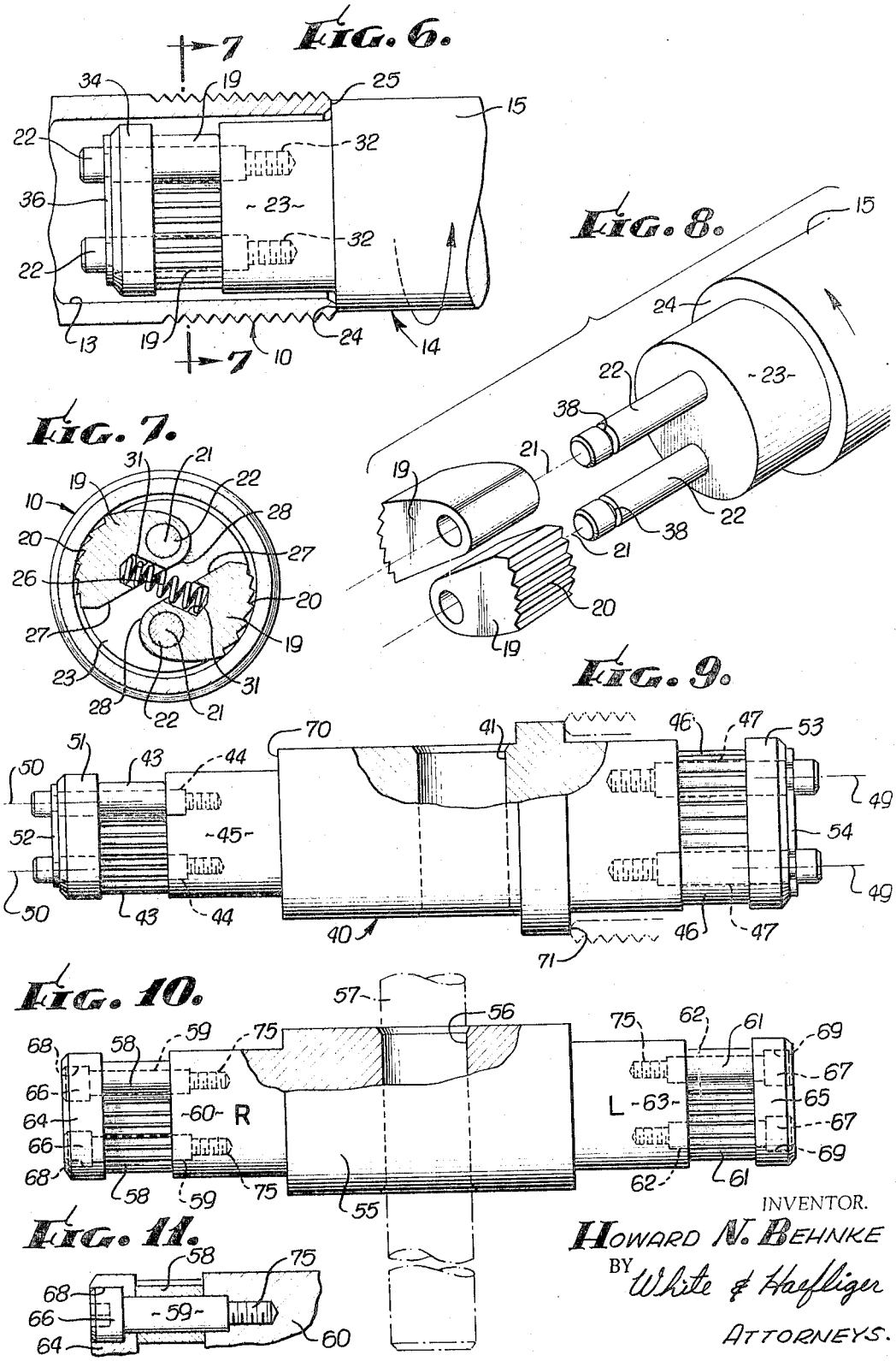

****

United States Patent Office 3,296,900
Patented Jan. 10, 1967

---

3,296,900
PIPE ROTATING DEVICE
Howard N. Behnke, Monterey Park, Calif., assignor to Collins Machinery Corporation, Monterey Park, Calif., a corporation of California
Filed Dec. 22, 1964, Ser. No. 420,317
8 Claims. (Cl. 81—72)

This invention relates generally to thread pipe connecting and unconnecting devices, and more particularly concerns a novel device operable upon insertion into an otherwise inaccessible pipe to engage the pipe bore and to selectively rotate the pipe in either thread connecting or unconnecting sense, as desired.

There has long been a need for a simple, easily manipulable device capable of insertion into a pipe end, and that will rotate the pipe in either thread connecting or thread unconnecting sense in response to selective rotation of the device exteriorly of the pipe. Such a need arises at least in part due to the fact that installed pipe ends are often completely surrounded by structural members, framing and the like, whereby it is impossible to apply a wrench or other tool to the exterior to rotate it. One type device that is capable of insertion into a pipe end for rotating the pipe in one direction only is exemplified in U.S. Patent 1,518,087 to McMullen. The latter device does not fulfill the need referred to above because it cannot be adjusted or used to rotate the pipe in the opposite direction, and it does not have the unusual structural features and results found in the device of the present invention, as will appear.

Accordingly it is a major object of the invention to provide a simple, easily operable device which will fully meet the need spoken of above. Basically, the novel pipe connecting and unconnecting device comprises a shank adapted to be axially rotated, multiple jaws having teeth presented outwardly to engage a pipe bore, means releasably mounting the jaws to the shank so that the jaws may be shifted between a first position in which they are swingable outwardly in one rotary direction to engage a pipe bore for rotating the pipe in unconnecting sense, and a second position in which the jaws are swingable outwardly in the opposite rotary direction to engage the pipe bore for rotating the pipe in connecting sense, together with other means including a spring to urge the jaws outwardly in each of said first and second positions.

More specifically, the jaw mounting means may comprise a pair of pivots projecting from the shank terminal for mounting two jaws for reversal between first and second positions, and the spring may comprise a single coil spring extending between the jaws and attached thereto for reversal therewith without detachment from the jaws. Further, a cap may typically be retained on the pivots in spaced relation to the shank terminal to protectively confine the spring in unexposed relation to the pipe bore, the cap being removable from the pivots after release therefrom of a slotted retainer releasably straddling the pivot terminals and having tongue and groove connection therewith at the side of the cap opposite the jaws.

It is a further object of the invention to provide a device of the above character having two sets of multiple jaws, respectively located at opposite ends of a carrier shank, each set having the reversibility features described but the sets differing in that one is adapted to connect and unconnect threaded pipe of relatively reduced bore size, whereas the other set is adapted to connect and unconnect threaded pipe of relatively larger size. A still further object in to provide a device having two sets of multiple jaws respectively located at opposite ends of a carrier shank, one set being adapted to be rotated in a pipe bore to rotate the pipe in thread connecting sense, and the other set adapted to be rotated in the same pipe bore to rotate the pipe in thread unconnecting sense.

These and other objects and advantages of the invention, as well as the details of illustrative embodiments, will be more fully understood from the following detailed description of the drawings in which:

FIG. 1 is a side elevation of one form of pipe rotating device embodying the invention and shown inserted in the bore of a pipe end inaccessible to an exterior wrench;

FIG. 2 is an enlarged section taken on line 2—2 of FIG. 1;

FIG. 3 is a section taken on line 3—3 of FIG. 2;

FIG. 4 is a section taken on line 4—4 of FIG. 2 to show the end of the pipe rotating device;

FIG. 5 is an axially exploded view of the FIG. 1 device;

FIG. 6 is a view like FIG. 2 but showing the jaws reversed for rotating the pipe in threaded connecting sense;

FIG. 7 is a section taken on line 7—7 of FIG. 6;

FIG. 8 is an axially exploded view of the device in the reversed jaw configuration of FIG. 6;

FIG. 9 is a side elevational showing of a modified device embodying the invention;

FIG. 10 is a side elevational showing of another modified device embodying the invention; and FIG. 11 is an enlarged fragmentary showing of the FIG. 10 cap connection to a pivot.

Referring first to FIGS. 1–5, a pipe is seen at 10 as having an externally threaded terminal 11 projecting through a panel 12 in such manner that it is difficult to grip exteriorly by a wrench on the other tool. In accordance with the invention, the pipe bore 13 may be gripped by the novel device to be described, for rotating the pipe clockwise or counterclockwise, that is in thread connecting or unconnecting sense.

The device generally indicated at 14 comprises a shank 15 adapted to be axially rotated as for example by a tool 16. The latter has a socket 17 fitting over the polygonal projection 18 at one end of the shank.

Device 14 also includes multiple jaws having teeth presented outwardly to engage a pipe bore, as well as means releasably mounting the jaws to the shank so that the jaws may be shifted between a first position in which the jaws are swingable outwardly in one rotary direction to engage the pipe bore for rotating the pipe in unconnecting sense, and a second position in which the jaws are swingable outwardly in the opposite rotary direction to engage the pipe bore for rotating the pipe in connecting sense. In the example shown, a pair of jaws 19 is provided to have serrations or teeth 20 presented radially outwardly and mutually oppositely in spaced relation to the jaw pivot axes 21. The latter are defined by a pair of pivots 22 projecting from the shank cylindrical terminal 23, which has reduced diameter for reception within the pipe bore. Such reception is limited by a shank shoulder 24 engageable with the pipe end 25.

Comparison of FIGS. 3 and 7 will reveal that the pivots 19 mount the jaws for reversal between the position of FIG. 3 and the position of FIG. 7. In FIG. 3 the jaws are swingable outwardly about the pivots in counterclockwise sense to engage a pipe bore for rotating the pipe in thread unconnecting sense, i.e. in a left hand direction, whereas in FIG. 7 the jaws are swingable outwardly about the pivots in clockwise sense to engage a pipe bore for rotating the pipe in thread connecting sense, i.e. in a right hand direction. In each of these views it will be seen that the jaws are constructed for limited inward swinging against the force exerted by a compression spring 26, in order that they may be inserted into the pipe bore in the first instance. Such inward swinging is limited by interengagement of the jaw interior faces 27 and 28.

Once the jaws have been inserted into a pipe bore, the coil spring 26 urges them outwardly in each of the positions seen in FIGS. 3 and 7, for effecting gripping engagement of teeth 20 with the pipe bore. The single coil spring is seen to extend between the jaws and transversely across the shank central axis 30 endwise beyond the shank terminal 23. Further, the spring is attached to each jaw for reversal therewith as a unit, without detachment from the jaws. Such attachment may be effected by a press fit engagement of the spring end portions with the jaw bores 31. Pivots 22 may comprise pins as shown, and may be thread connected at 32 into the shank terminal 23. In this regard, the jaws are journaled on the pivots at 33, and are also quickly removable therefrom for reversal.

Additional structure mounting the jaws to the pivots includes a cap 34 having bores 35 through which the pivots project, the cap then being retained on the pivots in spaced relation to the shank terminal and protectively confining the spring 26 in unexposed relation to the pipe bore. Retention of the cap is accomplished in the illustrated example by means of a thin retainer or clip 36 having parallel slots 37 and releasably straddling the pivots at the side of the cap opposite the jaws. Slots 37 are sized to closely receive reduced diameter portions 38 of the pivots affording a tongue and groove connection between the retainer and pivots, the fit being such that the retainer stays in place until knocked off the pivots. When it is desired to reverse the jaws on the pivots, it is only necessary to remove the retainer 36 and the cap 39 from the pivots, slip the jaws and spring off the pivots and reversely apply them thereto, and then reapply the cap and retainer to the pivots.

The modified double ended device seen in FIG. 9 comprises a shank 40 having first means to be engaged by a tool for axially rotating the shank. Such means may comprise a transverse opening 41 in the shank to receive a turning arm. The device also includes a first pair of like jaws 43, similar to jaws 19, having teeth presented outwardly to engage a relatively reduced diameter pipe bore. These jaws are mounted on a first pair of pivots 44 projecting from one terminal 45 of the shank, and in such manner as to be reversible between a pair of positions as indicated previously by FIGS. 3 and 7. The device further includes a second pair of like jaws 46, similar to jaws 19, having teeth presented outwardly to engage a relatively larger diameter pipe bore. Jaws 46 are mounted on a second pair of pivots 47 projecting from the opposite terminal 48 of the shank, and in such manner as to be reversible between a pair of positions as previously described. It will be noted in this regard that the parallel axes 49 pivots 47 are spread further apart than the parallel axes 50 of pivots 44. Pivots 44 and 47 are generally like pivots 22, and coil spring which are not shown are provided to urge each pair of reversible jaws 43 and 46 apart in the same manner as jaws 19 are so urged. Caps and retainers are also provided at each end of the device at 51, 52, 53 and 54, as illustrated. Shank shoulders to abut pipe ends are seen at 70 and 71.

FIGURE 10 illustrates a further modified device comprising a shank 55 having an aperture 56 to receive an arm 57 to turn the shank. The device has a first pair of like jaws 58 mounted for swinging, as described in FIGS. 1–8, on a first pair of pivots 59 which project from shank terminal 60. Also, a second pair of like jaws 61 is mounted for swinging, as described in FIGS. 1–8, in a second pair of pivots 62 which project from shank terminal 63.

Jaws 58 and 61 are of like size to engage the same size pipe bore, but they are mounted on the pivots in reverse sense so that jaw 58 will engage the pipe bore to rotate the pipe in right hand sense, whereas jaws 61 my alternatively be used to engage the bore and rotate the pipe in left hand sense. A coil spring, not shown, urges the jaws of each pair apart in a manner similar to that described above.

Caps 64 and 65 are received in the respective pivot pairs and retained thereon as by reception of the pivot heads 66 and 67 in cap recesses 68 and 69. The pivots may be threaded into the shank, as indicated at 75 so as to be removable to allow reversing of the jaws of each pair, if desired, and in the manner described above in connection with FIGS. 3 and 7.

It is also possible to use the device disclosed herein as a pipe nipple chuck in order to eliminate the need for special threaded adapters for chucking pipe.

I claim:

1. A pipe connecting and unconnecting device, comprising a shank adapted to be axially rotated, a pair of like jaws having teeth presented outwardly to engage a pipe bore, means at the shank terminal releasably mounting the jaws to the shank so that the jaws may be shifted between a first position in which the jaws are swingable outwardly in one rotary direction to engage a pipe bore for rotating the pipe in unconnecting sense, and a second position in which the jaws are swingable outwardly in the opposite rotary direction to engage the pipe bore for rotating the pipe in connecting sense, and other means including a coil spring to urge the jaws outwardly in each of said positions, the coil spring extending between said jaws and transversely generally across the shank axis beyond the shank terminal, the spring attached to each jaw for shifting therewith.

2. A threaded pipe connecting and unconnecting device, comprising a shank, first means on the shank to be engaged by a tool for axially rotating the shank, a pair of like jaws having teeth presented outwardly to engage a pipe bore, second means including two pivots projecting from the shank terminal and mounting said jaws for reversal between a pair of positions in one of which the jaws are swingable outwardly in one rotary direction to engage a pipe bore for rotating the pipe in thread unconnecting sense, and in another of which the jaws are swingable outwardly in the opposite rotary direction to engage the pipe bore for rotating the pipe in thread connecting sense, and spring means to urge the jaws outwardly in each of said positions, said spring means comprising a single coil spring extending between said jaws and transversely across the shank axis beyond the shank terminal, the spring being attached to each jaw for reversal therewith without detachment from the jaw.

3. A device as defined in claim 2 in which said second means includes a cap retained on the pivots in spaced relation to the shank terminal and to protectively confine the spring in unexposed relation to the pipe bore.

4. A device as defined in claim 3 in which said second means includes a slotted retainer releasably straddling the pivots and having tongue and groove connection therewith at the side of said cap opposite the jaws for retaining the cap on the pivots, the cap having through openings passing the pivots.

5. A device as defined in claim 2 in which said first means comprises a recess sunk in the side of the shank in axially spaced relation to the jaws.

6. A threaded pipe connecting and unconnecting device, comprising a shank having first means to be engaged by a tool for axially rotating the shank, a first pair of like jaws having teeth presented outwardly to engage a relatively reduced pipe bore, a second pair of like jaws having teeth presented outwardly to engage a relatively larger pipe bore, second means including a first pair of pivots projecting from one terminal of the shank and mounting the first pair of jaws for reversal between a pair of positions in one of which said first jaws are swingable outwardly in one rotary direction to engage a reduced pipe bore for rotating the pipe in thread unconnecting sense, and in the other of which the first jaws are swingable outwardly in the opposite rotary direction to engage the reduced pipe bore for rotating that pipe in thread connecting sense, said second means including a second pair of pivots projecting from the opposite terminal of the shank and mounting the second pair of jaws for reversal between a pair of positions in one of which said second jaws are swingable outwardly in one rotary direction to engage a larger pipe bore for rotating the pipe in thread unconnecting sense, and in the other of which the second jaws are swingable outwardly in the opposite rotary direction to engage the larger pipe bore for rotating the pipe in thread connecting sense, and spring means to urge the jaws of each pair outwardly in each of said positions, said spring means comprising a single coil spring extending between said first jaws and a single coil spring extending between said second jaws, said springs extending transversely across the shank axis beyond the shank terminals, said springs being attached to said respective jaw pairs for reversal therewith without detachment from the jaws.

7. A device as defined in claim 6 in which said second means includes caps retained on the pivots in spaced relation to the respective shank terminals and to protectively confine the springs in unexposed relation to the pipe bore.

8. A threaded pipe connecting and unconnecting device, comprising a shank having first means to be engaged by a tool for axially rotating the shank, a first pair of like jaws having teeth presented outwardly to engage a pipe bore, a second pair of like jaws having teeth presented outwardly to engage a pipe bore, second means including a first pair of pivots projecting from one terminal of the shank and mounting the first pair of jaws to swing outwardly to engage a pipe bore for rotating the pipe in thread unconnecting sense, said second means including a second pair of pivots projecting from the opposite terminal of the shank and mounting the second pair of jaws to swing outwardly to engage said pipe bore for rotating the pipe in thread connecting sense, and spring means to urge the jaws of each pair outwardly, said spring means comprising a single coil spring extending between the first jaws and a single coil spring extending between the second jaws, said springs extending transversely and generally across the shank axis projecting beyond the shank terminals, said springs being attached to said respective jaw pairs.

References Cited by the Examiner

UNITED STATES PATENTS

| 1,140,567 | 5/1915 | Boring | 81—533 |
| 1,518,087 | 12/1924 | McMullen | 81—72 |
| 1,908,622 | 5/1933 | Baker et al. | 81—72 |
| 2,819,636 | 1/1958 | Woerner | 81—72 |
| 3,112,116 | 11/1963 | Seitz | 279—2 |

FOREIGN PATENTS 205,291  12/1908  Germany.

WILLIAM FELDMAN, *Primary Examiner.*

JAMES L. JONES, JR., *Examiner.*